United States Patent
Antao et al.

(10) Patent No.: US 9,495,274 B1
(45) Date of Patent: *Nov. 15, 2016

(54) ADAPTIVE RUNTIME FOR A MULTIPROCESSING API

(71) Applicant: International Business Machines Corporation, Armonk, NY (US)

(72) Inventors: Samuel F. Antao, Somerville, MA (US); Carlo Bertolli, Dobbs Ferry, NY (US); Alexandre E. Eichenberger, Chappaqua, NY (US); John K. O'Brien, South Salem, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/953,651

(22) Filed: Nov. 30, 2015

Related U.S. Application Data (63) Continuation of application No. 14/860,986, filed on Sep. 22, 2015.

(51) Int. Cl.
  G06F 9/54 (2006.01)
  G06F 11/34 (2006.01)
  G06F 11/30 (2006.01)

(52) U.S. Cl.
  CPC ............ *G06F 11/3409* (2013.01); *G06F 9/54* (2013.01); *G06F 11/302* (2013.01)

(58) Field of Classification Search
  CPC .... G06F 11/3409; G06F 9/54; G06F 11/302; G06F 8/443
  See application file for complete search history.

(56) References Cited

U.S. PATENT DOCUMENTS

| | | | |
|---|---|---|---|
| 2011/0145926 A1* | 6/2011 | Dalcher et al. | 726/26 |
| 2011/0270963 A1* | 11/2011 | Saito | G06F 21/105 709/224 |
| 2013/0283250 A1* | 10/2013 | Eichenberger et al. | 717/144 |
| 2014/0157291 A1* | 6/2014 | Adams et al. | 719/331 |
| 2015/0339158 A1* | 11/2015 | Harris et al. | 718/103 |

OTHER PUBLICATIONS

List of IBM Patents or Patent Applications Treated as Related; (Appendix P), Filed Feb. 17, 2016, 2 pages.
Samuel F. Antao, et al. Pending U.S. Appl. No. 14/860,986 entitled "Adaptive Runtime for a Multiprocessing API," filed with the U.S. Patent and Trademark Office on Sep. 22, 2015.

* cited by examiner

*Primary Examiner* — Syed Roni
(74) *Attorney, Agent, or Firm* — Cantor Colburn LLP (57) ABSTRACT

A computer-implemented method includes selecting a runtime for executing a program. The runtime includes a first combination of feature implementations, where each feature implementation implements a feature of an application programming interface (API). Execution of the program is monitored, and the execution uses the runtime. Monitor data is generated based on the monitoring. A second combination of feature implementations are selected, by a computer processor, where the selection is based at least in part on the monitor data. The runtime is modified by activating the second combination of feature implementations to replace the first combination of feature implementations.

8 Claims, 4 Drawing Sheets

ADAPTIVE RUNTIME FOR A MULTIPROCESSING API

DOMESTIC PRIORITY

This application is a continuation of U.S. patent application Ser. No. 14/860,986, filed Sep. 22, 2015, and all the benefits accruing therefrom under 35 U.S.C §119, the contents of which is herein incorporated by reference in its entirety.

STATEMENT OF GOVERNMENT INTEREST

This invention was made with Government support under Contract No.: B604142 awarded by the Department of Energy. The Government has certain rights in this invention.

BACKGROUND

Embodiments of the present invention relate to multiprocessing systems and, more specifically, to an adaptive runtime for a multiprocessing application program interface (API).

Various multiprocessing APIs, such as open multiprocessing (OpenMP), exist for programming parallel machines, in which memory is shared across multiple processors. Generally, processing in parallel machines allows for a master thread to recruit worker threads to perform work in parallel, thus more efficiently completing a program's workload.

For the use of a multiprocessing API, a compiler transforms a user program into executable code. A runtime environment supports the compiler and, when the program runs, performs overhead operations to enable some work of the program to be performed in parallel. For example, the runtime environment can maintain a list of available worker threads, assign work items to the threads, and synchronize the threads as needed.

A model for a multiprocessing API may include compiler directives, library routines, and environment variables, which can be implemented in a runtime environment in various ways. The behavior of the runtime environment is dependent on this implementation. Thus, a program may run more efficiently with one runtime environment versus another.

SUMMARY

According to an embodiment of this disclosure, a computer-implemented method includes selecting a runtime for executing a program. The runtime includes a first combination of feature implementations, where each feature implementation implements a feature of an application programming interface (API). Execution of the program is monitored, and the execution uses the runtime. Monitor data is generated based on the monitoring. A second combination of feature implementations are selected, by a computer processor, where the selection is based at least in part on the monitor data. The runtime is modified by activating the second combination of feature implementations to replace the first combination of feature implementations.

In another embodiment, a system includes a memory having computer readable instructions and one or more processors for executing the computer readable instructions. The computer readable instructions include selecting a runtime for executing a program. The runtime includes a first combination of feature implementations, where each feature implementation implements a feature of an API. Further according to the computer readable instructions, execution of the program is monitored, and the execution uses the runtime. Monitor data is generated based on the monitoring. A second combination of feature implementations are selected, by a computer processor, where the selection is based at least in part on the monitor data. The runtime is modified by activating the second combination of feature implementations to replace the first combination of feature implementations.

In yet another embodiment, a computer program product for adapting a runtime of a program includes a computer readable storage medium having program instructions embodied therewith. The program instructions are executable by a processor to cause the processor to perform a method. The method includes selecting a runtime for executing a program. The runtime includes a first combination of feature implementations, where each feature implementation implements a feature of an API. Further according to the method, execution of the program is monitored, and the execution uses the runtime. Monitor data is generated based on the monitoring. A second combination of feature implementations are selected, by a computer processor, where the selection is based at least in part on the monitor data. The runtime is modified by activating the second combination of feature implementations to replace the first combination of feature implementations.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are configured to adapt, or customize, a runtime for a program based on a multiprocessing application programming interface (API), such as open multiprocessing (OpenMP) or message passing interface (MPI), by selecting one or more available runtimes through monitoring the program. To this end, some embodiments of the customization system provide various feature implementations, which may be incorporated into a runtime. The customization system may then monitor the program and decide whether to switch to a different combination of feature implementations.

Figure 1:
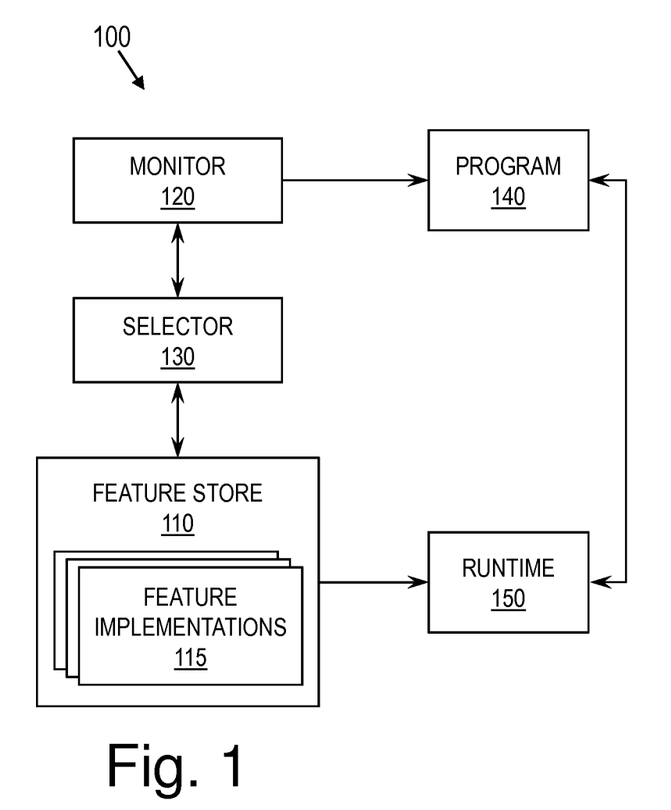
FIG. 1 is a first block diagram of a customization system for adapting runtimes for a program, according to some embodiments of this disclosure.

FIG. 1 is a block diagram of a customization system 100, according to some embodiments of this disclosure. As shown, the customization system 100 may include a feature store 110, a monitor 120, and a selector 130, each of which may include hardware, software, or a combination of both. The feature store 110 may include one or more feature implementations 115. Each feature implementation 115 is an implementation of an available feature for a runtime 150 of an API, which may be a multiprocessing API such as OpenMP. A runtime 150 may be made up of a combination of feature implementations, including one feature implementation for each available feature of the API. Each combination of feature implementations 115 in a runtime 150 may be a proper subset of the total set of feature implementations 115 in the feature store 110. The features being implemented may be, for example, library routines and environment variables. The behavior of a runtime 150 may be defined by the combination of feature implementations 115 in that runtime 150.

One feature of the API is the degree of concurrency, which refers to the quantity of worker threads that can operate at once. Depending on feature implementations, concurrency can be high or low, where a high concurrency may negatively impact other features. For example, high concurrency may require a large overhead to create the capability of that high concurrency, and thus, a runtime 150 with high concurrency may also have an undesirably large overhead. Overhead refers to the set of operations and the time spent managing parallelism.

Another feature of the API may be the existence and efficiency of task assignments. Tasks are small items of work. Generally, a runtime 150 assigns work to each worker thread in a set of worker threads, as part of the overhead for parallelism. Tasks, however, are small items of work assigned by the runtime 150 after parallelism has begun and after the worker threads are already processing their assigned work. For an example of task management, suppose three worker threads are being used to process three binary trees. Further, in this example, a first binary tree includes only a single node, a second binary tree includes a hundred nodes, and a third binary tree includes two hundred nodes. It takes an approximately fixed amount of time X for a single node to be processed by a worker thread.

In a first variation of this example, when work is assigned in the overhead, the runtime 150 assigns a binary tree to each worker thread. The first binary tree is assigned to a first worker thread, the second binary tree is assigned to a second worker thread, and the third binary tree is assigned to a third worker thread. During processing, it takes the first worker thread X time to complete its work, it takes the second worker thread 100× time, and it takes the third worker thread 200× time. Thus, it takes 200× time for all worker threads to complete their work. In this first variation of the example, it is clear that the work available was not divided evenly among the available worker threads.

In a second variation of this example, when work is assigned in the overhead, the runtime 150 assigns only the root node of each binary tree to the worker threads. The root node of the first binary tree is assigned to the first worker thread, the root node of the second binary tree is assigned to the second worker thread, and the root node of the third binary tree is assigned to the third worker thread. Additionally, the runtime 150 maintains a task queue, which may initially be empty. During processing of the work assigned, each worker thread completes its initially assigned work in X time. The second and third threads observe that one or more additional nodes exist in their binary trees, and the runtime 150 adds the processing of those nodes to the task queue. Each node corresponds to a task to be performed, where that task is the processing of that node. All three worker threads, having finished their assigned work, are then assigned additional nodes from the task queue. As processing continues, the second and third threads continue to add tasks to the task queue when discovering nodes that require processing, and all three nodes may be assigned tasks from the task queue when they complete the work, including tasks, that has been assigned to them. By the time processing ends, all three worker threads may have performed approximately the same amount of work, and it may take the worker threads approximately 100× for all of them to complete their work. Thus, the use of a task queue in this manner results in more efficient processing of all available work.

Depending on the feature implementations of the runtime 150, a task queue may or may not exist and may operate more or less efficiently. However, an implementation with an efficient task queue is likely to have a larger overhead. Thus, a tradeoff exists here, as with other features. For example, at one extreme, no task queue is used and the runtime 150 causes each worker thread to execute all work initially assigned to it, while at the other extreme, each task created is added to the task queue and may be assigned to any worker thread as needed.

Another feature of the API may be the ability and efficiency of performing nested parallelism. As discussed above, parallelism occurs when worker threads are used in parallel to complete work that belongs to a master thread. Nested parallelism occurs during parallelism, when an initial worker thread's work is further divided among other worker threads, making the initial worker thread a master thread for the work assigned to it. Depending on feature implementations of the runtime 150, nested parallelism may or may not be possible and, if possible, may include small or large additional overhead. For instance, the existence of nested parallelism may increase the runtime's overhead, and the level of concurrency allowed during nested parallelism may further affect the overhead. Thus, once again, tradeoffs may be involved when implementing nested parallelism in a runtime 150. For example, at one extreme, a runtime 150 may not implement nested parallelism at all, while at the other extreme, a runtime 150 may require a large overhead to provide full support for this feature with high concurrency.

Another feature of the API may be the use of workshares. Workshares are engaged during iterative loops, when each worker thread processes a set of the iterations in parallel with other worker threads processing other sets of iterations for the same loop. If a program 140 includes a no-wait clause along with the workshare, a worker thread need not wait for other worker threads to finish their iterations before proceeding with other work. The use of a no-wait clause, at a time when waiting is unnecessary, can enable a worker thread to operate more efficiently by allowing that worker thread to move forward rather than waiting unnecessarily. However, the ability to wait at a no-wait case may require increased overhead in the runtime 150. For example, at one extreme, a runtime 150 may ignore no-wait clauses such that all worker threads must wait for other iterations to complete, while at the other extreme, a runtime 150 recognize no-wait clauses and thus increase concurrency at the cost of a larger overhead.

It will be understood that the multiprocessing API may support various other features instead of or in addition to the ones described above. For example, additional features may provide debugging or performance tracing tools.

As discussed above, the feature store 110 may include various feature implementations, which may include one or more implementations of each available feature. Thus, a runtime's behavior may be modified or adapted by swapping one feature implementation with another feature implementation for the same feature. Through the combinations of various available feature implementations, various runtimes 150 may be formed. For example, a first runtime 150 may have a small overhead. However, this first runtime 150 may not be ideal for a program 140 that requires high concurrency, nested parallelism, or efficient task management. A second runtime 150 may enable high concurrency, but that concurrency may come at the cost of a large overhead and lead to a potentially negative impact on other features. A third runtime 150 may have efficient task management, but this may come at the cost of a large overhead and lead to a potentially negative impact on other features. Further, a fourth runtime 150 may enable efficient nested parallelism, which may also come at the cost of a large overhead and lead to a potentially negative impact on other features.

It is likely the case that one combination of feature implementations 115 is more desirable for running a particular program 140, as opposed to another combination. For example, a program 140 may not need nested parallelism, and thus the overhead increase caused by efficient nested parallelism in a particular combination of feature implementations 115 may not be worthwhile when executing that program 140.

In some embodiments, a program 140 initially runs with a runtime 150 made up of a default combination of feature implementations 115 of the feature store 110. This particular runtime 150 is also referred to herein as the default runtime 150. The feature implementations 115 in the default runtime 150 may be selected by the selector 130 from the feature store 110 based on various criteria. For example, and not by way of limitation, one feature implementation may be selected for each available feature at random, or a fixed default runtime 150 may be used for all programs 140.

During execution of the program 140, the monitor 120 may monitor the program 140 and may generate monitor data based on that monitoring. For example, the monitor data may include runtime statistics of the program 140. To perform this monitoring, for example and not by way of limitation, the monitor 120 may remain in communication with the runtime 150, or may access a log file of the executing program 140.

Based on the monitor data, the selector 130 may determine which runtime 150 (i.e., which combination of feature implementations 115) the program 140 will use in the future. For example, if the selector 130 determines that the monitor data is acceptable, and thus that the program 140 is running in a desirable manner, the selector 130 may select the runtime 150 currently being used. In that case, the current combination of feature implementations 115 need not be changed. Alternatively, however, if the selector 130 determines that the monitor data is unacceptable, and thus the program 140 is not running in a desirable manner, the selector 130 may select an alternative runtime 150, made up of an alternative combination of feature implementations 115 from the feature store 110. The alternative combination may, but need not, include some overlap of feature implementations 115 with the current combination of feature implementations 115 in the runtime 150.

The selector 130 may determine acceptability of the monitor data in various ways. In some embodiments, to assist with this determination, the customization system 100 includes runtime counters to count how many times each feature is used, and data from the runtime counters may be included in the monitor data. In one example of determining acceptability of the monitor data, the selector 130 may receive monitor data indicating that a first feature is rarely used by the program 140. In that case, if the selector 130 detects that the current runtime 150 includes a fully implemented version of the first feature, the selector 130 may deem the monitor data to be unacceptable. Due to this unacceptability, the selector 130 may select an alternative combination of feature implementations 115 from the feature store 115. Specifically, for instance, the selector 130 may select a feature implementation 115 for the first feature that reduces support for the first feature, as the first feature is rarely used. Conversely, for another example, the selector 130 may receive monitor data indicating that a first feature is often used by the program 140. In that case, if the selector 130 detects that the current runtime 150 includes a reduced implementation of the first feature, the selector 130 may deem the monitor data unacceptable. Due to this unacceptability, the selector 130 may select an alternative combination of feature implementations 115 from the feature store 110, where the selected combination includes a feature implementation 115 for the first feature that increases support for the first feature. It will be understood that various other mechanisms may be used to determine acceptability of the monitor data.

When a runtime 150 is selected for use in the future, it can likely not be used right away, because the program 140 may still be in progress. Thus, when a runtime 150 is selected, its feature implementations may become active at the next appropriate time for switching runtimes 150. Such a time may occur, for example, when work is offloaded to a hardware accelerator. Such offloading generally creates a clean start, at which time a host machine may change the runtime 150. Such a time may also occur when a current parallelized phase of the program 140 completes (i.e., when work is being performed by a single master thread). In some embodiments, the selected feature implementations 115 may be changed individually, such that each feature implementation 115 becomes the active implementation for that feature when that feature is not in use. Thus, in this case, the selected runtime 150 may gradually become active as its feature implementations 115 become active individually. In this manner, the customization system 100 may adapt or modify the runtime 150 of a program 140 by replacing its combination of feature implementations 115 with a different combination of features 115.

In some embodiments, the monitor 120 continues to monitor the execution of the program 140, and the selector 130 continues to modify the runtime 150 with new selections as needed, while the program 140 runs. In some other embodiments, however, the customization system 100 may become inactive for the program 140 after stop criteria are met. For example, and not by way of limitation, the stop criteria may be met when the selector 130 finds the monitor data from the use of a runtime 150 to be acceptable.

Figure 2:
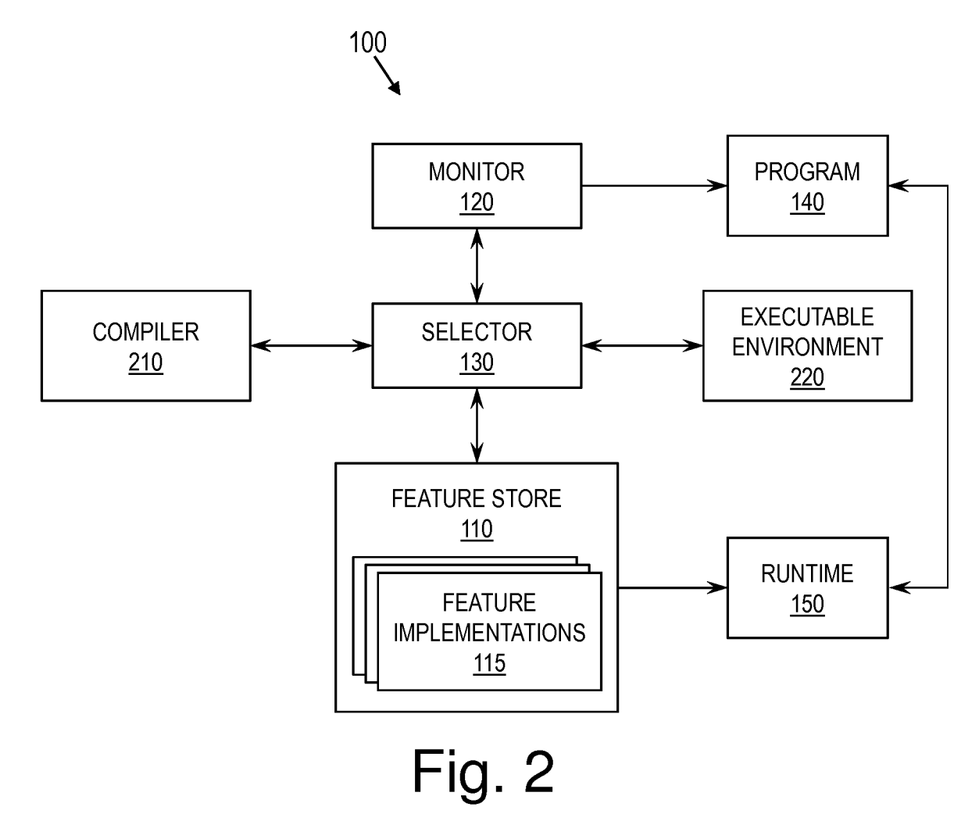
FIG. 2 is a second block diagram of the customization system, according to some embodiments of this disclosure.

FIG. 2 is a second block diagram of the customization system 100, according to some embodiments of this disclosure. As shown, the customization system 100 may receive input from a compiler 210, an executable environment 220, or both.

In some embodiments, the compiler 210 compiles the program 140 before the program 140 can be executed. When compiling the program 140, the compiler 210 has access to program code of the program 140. Based on this program code, the compiler may gain hints about what features of the multiprocessing API may be most useful to the program 140.

In some embodiments, the compiler 210 communicates this information to the selector 130 in the form of compiler data. The selector may thus consider this compiler data when selecting a runtime 150 for the program 140 to use.

The execution environment 220 is an environment in which a user runs the program 140. Within this environment, such as when initiating the program 140, the user may provide execution data related to the running of the program 140. For example, and not by way of limitation, when calling the program 140, the user may define global variables. In some embodiments, the selector 130 considers this execution data when selecting a runtime 150 for the program 140 to use.

Further, the selector 130 may use the compiler data, execution data, or both when deciding on a default runtime 150 for the program 140 to use before monitoring begins.

Figure 3:
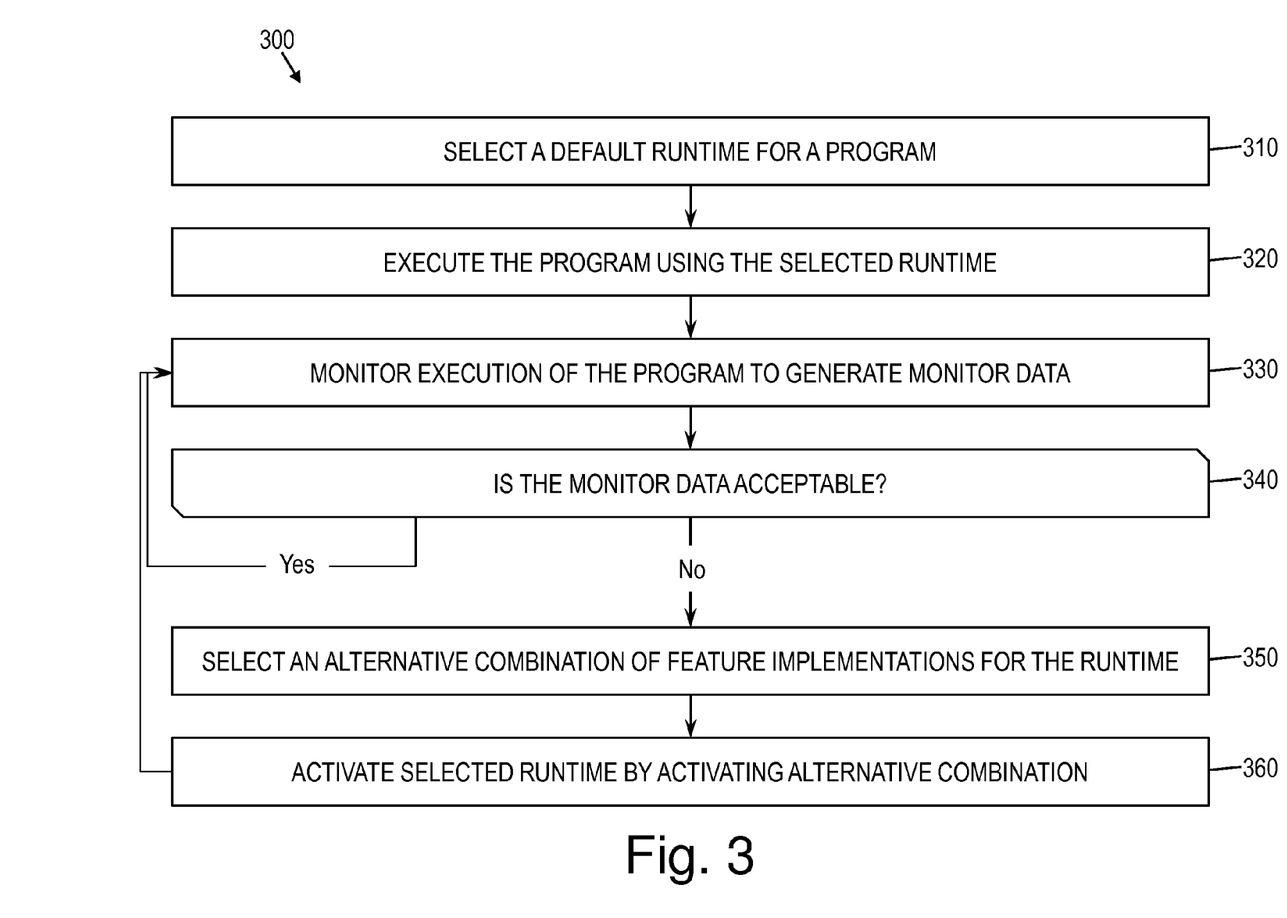
FIG. 3 is a flow diagram of a method for adapting a runtime for the program, according to some embodiments of this disclosure.

FIG. 3 is a flow diagram of a method 300 for adapting a runtime 150 for a program 140, according to some embodiments of this disclosure. As shown, at block 310, a default runtime 150 may be selected for the program 140. The selection of this default runtime 150 may include the selection of a combination of feature implementations 115 in the feature store 110. At block 320, the program 140 may begin executing with the default runtime 150. At block 330, execution with the current runtime 150 may be monitored, resulting in monitor data. At decision block 340, it may be determined whether the monitor data is acceptable. If so, then no change of the runtime 150 need be made at this time, but the monitor 120 may continue monitoring the program 140 at block 330. However, if the monitor data is deemed unacceptable, then at block 350, the runtime 150 may be modified (i.e., an alternative runtime 150 may be selected) by selecting a different combination of feature implementations 115 from the feature store 110. This selection may be based on a combination of monitor data, compiler data, and execution data. At block 360, when an appropriate time occurs, the selected runtime 150 may become active instead of the runtime 150 currently being used. The monitor 120 may then continue to monitor the program 140 at block 330.

Figure 4:
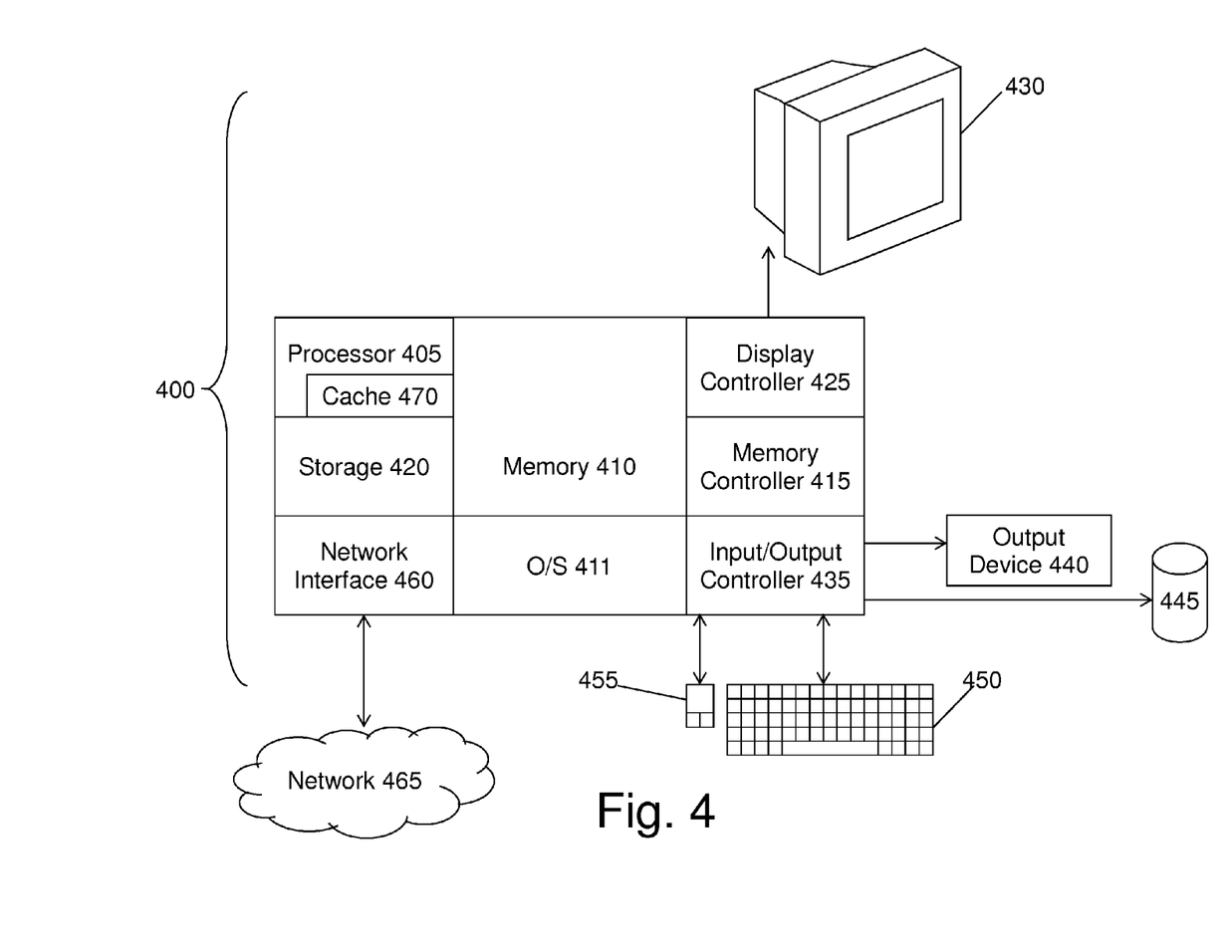
FIG. 4 is a block diagram of a computer system for implementing some or all aspects of the customization system, according to some embodiments of this disclosure.

FIG. 4 illustrates a block diagram of a computer system 400 for use in implementing a customization system or method according to some embodiments. The customization systems and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the customization systems and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Customization systems and methods according to this disclosure may be embodied, in whole or in part, in computer program products or in computer systems 400, such as that illustrated in FIG. 4.

Technical effects and benefits of some embodiments include the ability to automatically adapt or modify a runtime 150 of a program to improve performance of that program. According to some embodiments of the customization system 100, the feature implementations forming a runtime 150 may be customized for suitability to the program being executed, thus removing or reducing the need to manually select an appropriate runtime 150 for each program.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    selecting a runtime for executing a program, the runtime comprising a first combination of feature implementations, each feature implementation implementing a feature of an application programming interface (API);
    monitoring execution of the program, the execution using the runtime;
    generating monitor data based on the monitoring;
    determining, based on the monitor data, a frequency at which a first feature that is implemented by a first feature implementation in the first combination of feature implementations is used;
    selecting, by a computer processor, a second combination of feature implementations, the second combination of feature implementations replacing the first feature implementation with a second feature implementation configured to implement the first feature, the selecting the second combination of feature implementations being based at least in part on the frequency at which the first feature is used; and
    modifying the runtime by activating the second combination of feature implementations to replace the first combination of feature implementations.

2. The method of claim 1, wherein the runtime has a different behavior when comprising the first combination of feature implementations as compared to the second combination of feature implementations.

3. The method of claim 1, wherein selecting the second combination of feature implementations further comprises receiving compiler data related to the program, wherein the compiler data is generated based on compiling the program, and wherein selecting the second combination of feature implementations is further based at least in part on the compiler data.

4. The method of claim 1, wherein selecting the second combination of feature implementations further comprises receiving execution data based on user input into an execution environment, and wherein selecting the second combination of feature implementations is further based at least in part on the execution data.

5. The method of claim 1, wherein the API is at least one of open multiprocessing (OpenMP) and message passing interface (MPI).

6. The method of claim 1, wherein modifying the runtime by activating the second combination of feature implementations to replace the first combination of feature implementations further comprises:
    determining that the first feature implemented by the first feature implementation of the first combination of feature implementations is not in use; and
    replacing the first feature implementation with the second feature implementation of the first feature, responsive to determining that the first feature is not in use.

7. The method of claim 1, wherein modifying the runtime by activating the second combination of feature implementations to replace the first combination of feature implementations modifies at least one of: an overhead of the runtime, implementation of nested parallelism of the runtime, concurrency capability of the runtime, and task management of the runtime.

8. The method of claim 1, wherein modifying the runtime by activating the second combination of feature implementations to replace the first combination of feature implementations modifies at least one of: debugging provided by the runtime and performance tracing provided by the runtime.

* * * * *